UNITED STATES PATENT OFFICE.

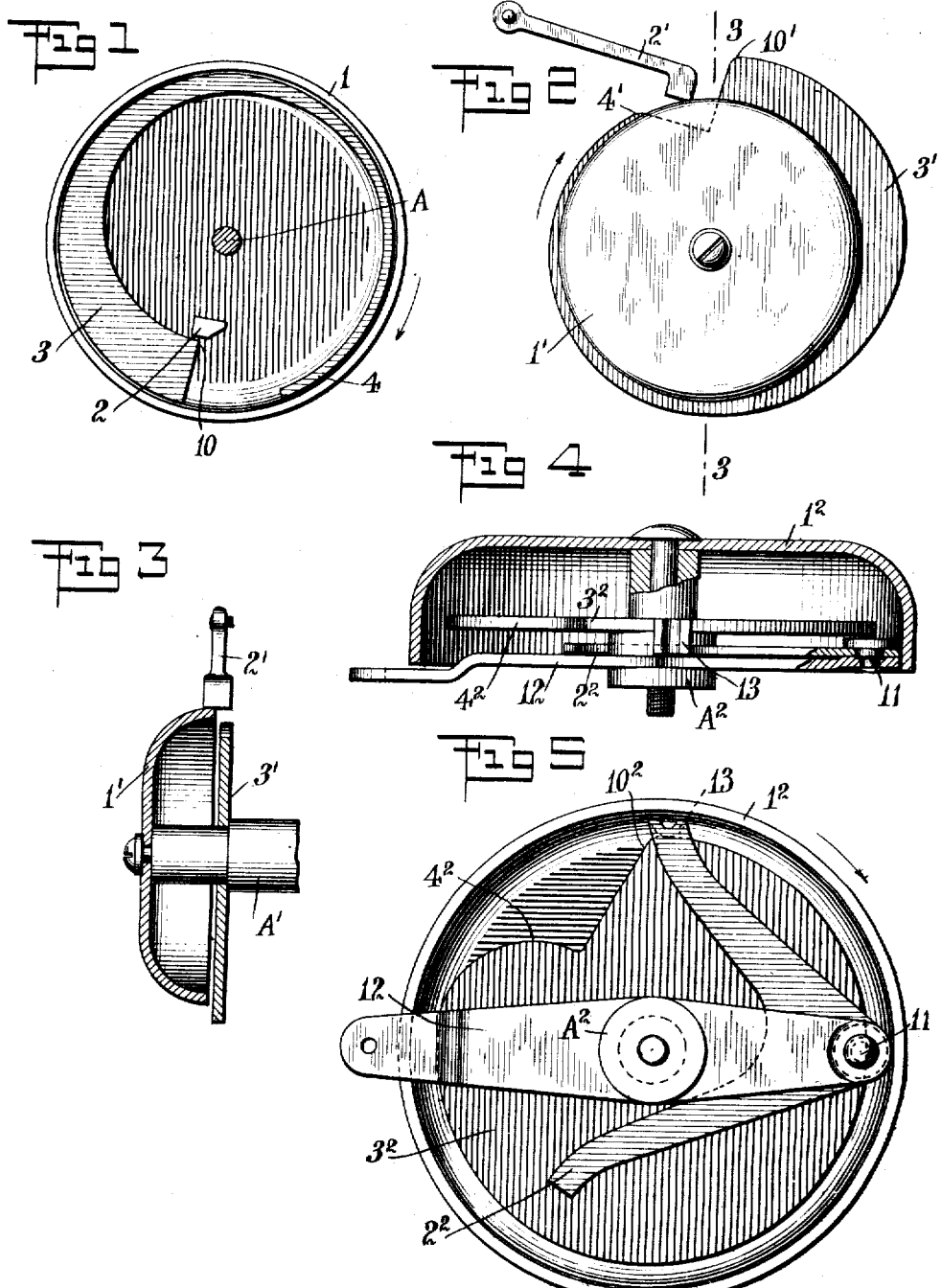

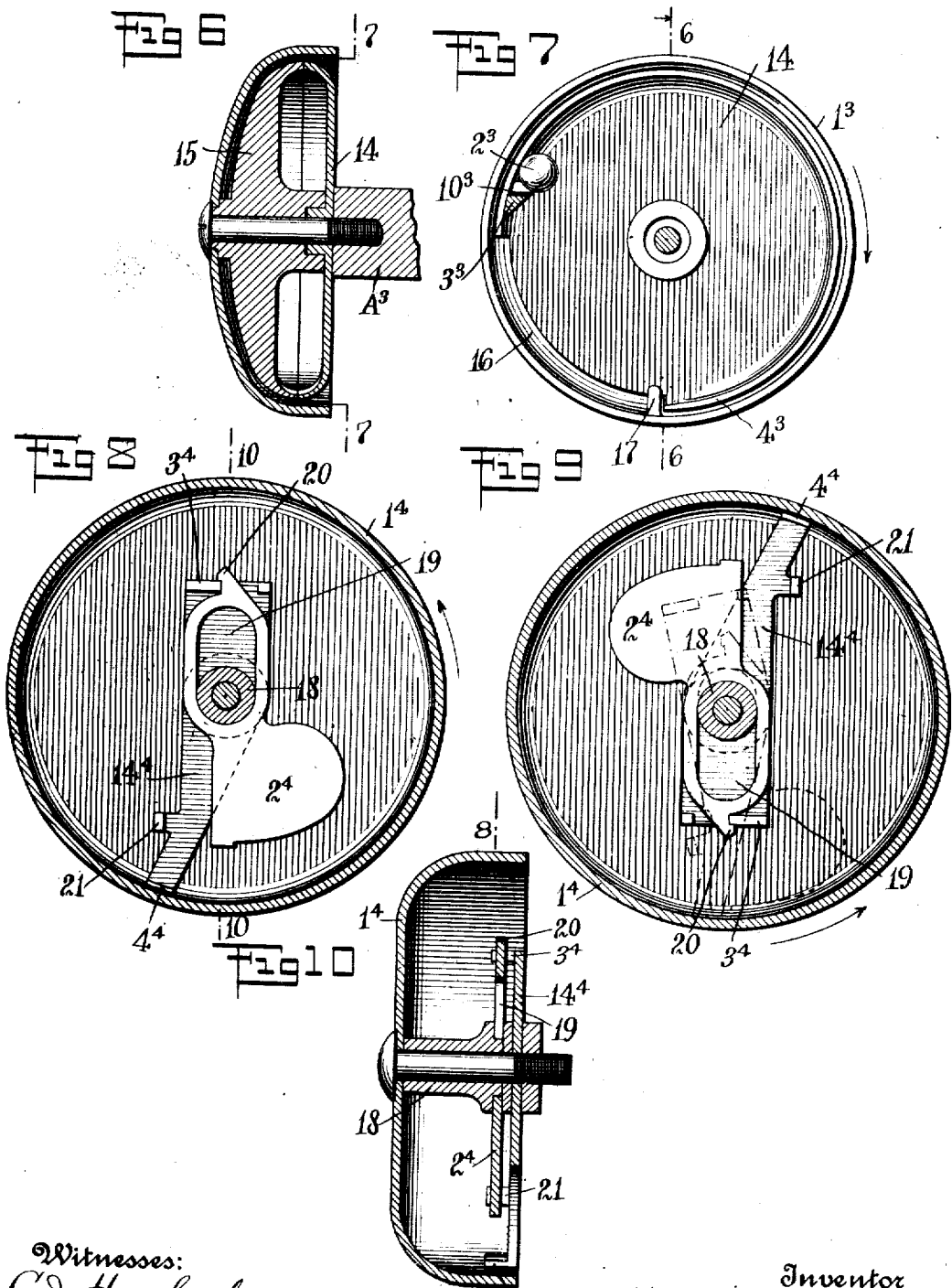

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

SPEED-INDICATOR.

1,150,130.  Specification of Letters Patent.  Patented Aug. 17, 1915.

Application filed July 25, 1914. Serial No. 853,029.

*To all whom it may concern:*

Be it known that I, MEREDITH LEITCH, a citizen of the United States, residing at Poughkeepsie, Dutchess county, New York, have invented certain new and useful Improvements in Speed-Indicators, of which the following is a full, clear, and exact description.

My invention relates to a speed indicator for a rotating shaft and has for its object to produce an accurate audible speed indicator.

It further has for its object to produce a speed indicator which is simple and inexpensive.

In many devices, of which cream separators may be cited as an example, it is necessary for the best efficiency that the speed be maintained at a uniform rate, or at least be not permitted to fall below a given rate. There are many forms of tachometer which will indicate to the eye the speed at which a shaft driving one of them is revolving, but these require that the attendant be close to the machine; that he have a good light and closely watch the indications. They are also expensive. The cream separators above referred to are often operated, particularly on winter mornings and afternoons, in places where the light is poor. They frequently are driven by a dog, goat or other power, so that except for the necessity of watching the speed, the attendant might be at some distance during much of the time while the machine is in operation.

The object of this invention is to provide an inexpensive indicator, giving a notice audible at a considerable distance from the machine when the speed is too high or too low. The improved indicator has a bell, which, if the speed is low, is rung once every revolution of the shaft that it is desired to regulate. If the speed is above a certain rate, the bell is not rung. This bell is loud enough to be heard at a considerable distance and so obviates the need of close supervision by an attendant. The indicator consists of a bell, a hammer to strike and ring the bell, and means to cock and release the hammer, and a device which when the speed is above a given rate, shields the bell from the striker and thus prevents the ringing of the bell.

The following is a description of speed indicators embodying my invention, reference being had to the accompanying drawings, in which,—

Figure 1 is a diagrammatic view showing the principle of operation; Fig. 2 is a side elevation of an indicator embodying my invention; Fig. 3 is a section of the indicator of Fig. 2 on the line 3—3; Fig. 4 is a plan view of the parts shown in horizontal section of another and the preferred form of indicator; Fig. 5 is a rear side elevation of the indicator of Fig. 4; Fig. 6 is a section of another modification on the line 6—6 of Fig. 7, and Fig. 7 is a transverse section on the line 7—7, Fig. 6; Fig. 8 is a section of another modification on the line 8—8, Fig. 10; Fig. 9 is a similar section with the parts in a different position; Fig. 10 is a section on the line 10—10, Fig. 8.

Referring more particularly to the drawings, 1 is a bell or gong.

2 is a striker tending to move toward the bell.

3 is a revolving cam which acts to move the striker away from the bell. It has a release point 10.

4 is a shield, in this case shown as a continuation of the cam, which, when the speed is above a given rate, prevents the striker from ringing the bell. The shield and cam are mounted on the shaft A.

In the operation of this device the cam and, if desired, the bell also, is rotated in a clockwise direction. This cocks or raises the striker to the position shown in Fig. 1, whereupon an additional movement releases the striker, which moves by some force, such as gravity, toward the bell. If the parts are revolving slowly enough, the striker hits the bell. If, however, the parts are revolving at a sufficiently high speed, the end of the shield 4 comes between the striker and the bell so as to prevent the hammer from hitting the bell.

In the device shown in Fig. 2, 1' is the bell; 2' is a pivoted striker; 3' is a cam having an indentation forming a release point 10', and an intercepting portion 4'. The cam and the bell are mounted upon a shaft A' so as to rotate therewith. The operation of the device is similar to that shown in Fig. 1. the striker 2' hitting the bell when it is released by the shoulder 10' if the speed is sufficiently low, and being intercepted by the shield 4' if the speed is sufficiently high to bring that portion beneath the striker before it hits the bell. In this case the direction of rotation is clockwise.

In the form shown in Figs. 4 and 5, the operating members are inclosed within the bell. $1^2$ is the bell. $2^2$ is the striker. $3^2$ is a cam, mounted to rotate with the portion $A^2$, which constitutes a continuation of the revolving shaft. The striker is pivotally mounted at 11 upon a supporting arm 12. This arm extends beyond the bell and is movably mounted about the axis of the portion $A^2$, and can be held in any desired position. By varying its position, the action of the striker can be varied so that in different positions it will indicate different rates of revolution. The striker is provided with a horizontal extension 13, which engages the edge of the cam. The cam is provided with a leasing shoulder $10^2$ and an intercepting portion $4^2$. The engaging portion 13 and the striking portion of the striker are on opposite sides of the axis of the rotating shaft. In the operation of this device, the cam and the bell are rotated clockwise (Fig. 5) with the result that when the shoulder $10^2$ releases the bearing portion 13, the striker is free to fall so that the lower end of the striker hits the bell if the speed is below a given rate. If the speed is sufficiently high, however, the intercepting portion $4^2$ intercepts the extension 13 so as to prevent the lower end of the striker from hitting the bell.

In the modification shown in Figs. 6 and 7, a ball is used as a striker. In this modification $1^3$ is the bell. $2^3$ is the striker. $3^3$ is the striker-raising and releasing means, and $4^3$ is the intercepting portion. The parts $3^3$ and $4^3$ are carried by a disk 14. In order to form a race for the ball a member 15 is provided. The parts 14 and 15 are cut away as at 16 to expose a portion of the bell to the action of the striker. The portions 14 and 15 are connected to the revolving shaft $A^3$ so as to rotate therewith. The bell is preferably provided with a projection 17 adjacent to the intercepting portion $4^3$ for the purpose hereinafter described. When this projection is used, the bell also is secured to the shaft so as to rotate therewith, as shown. In the operation of this modification, the shaft is rotated clockwise, as shown by the arrow in Fig. 7. The striker-raising portion with its release shoulder $10^3$ lifts the ball $2^3$ to the position shown, whereupon it falls, and if the speed is sufficiently low strikes the bell $1^3$ or the projection 17, or both. If the speed is sufficiently high so as to move the intercepting portion $4^3$ between the ball and the bell before contact is made with the bell or the lug 17, the bell is not rung.

In the modification shown in Figs. 8, 9 and 10, $1^4$ is the bell; $2^4$ is the striker; $3^4$ is a releasing abutment; and $4^4$ is an intercepter. The intercepter and releasing abutment are mounted on the plate $14^4$ and together with the bell are secured to the shaft so as to rotate therewith. Within the bell is a standard 18 having near its base an annular groove, within which the shank of the striker freely slides. The shank of the striker is provided with an elongated opening 19 surrounding the base of the standard and is also provided with a hook 20, which engages the releasing abutment $3^4$ at certain times. The intercepter is also provided with a lateral projection or stud 21 for the purpose hereinafter described. The operation of this device is as follows: The parts rotate in a counter-clockwise direction, as shown by the arrow in Fig. 8. When the parts are in the position shown in Fig. 8 and the rotation is continued, the action of gravity upon the striker causes the hook 20 to release the abutment $3^4$ so that it is free to fall toward the bell. It thereupon falls toward the bell and strikes the same if the speed is sufficiently low. If the speed is sufficiently high to bring the intercepter $4^4$ between the striker and the bell before the striker reaches the bell, the intercepter $4^4$ prevents the ringing of the bell. As the parts continue to rotate, the stud 21 engages the striker and causes it to rotate with the other parts, until it has been rotated nearly 180°. It then falls downward so that the hook 20 comes adjacent to the portion $3^4$ and on further rotation tips over until the hook 20 engages the portion $3^4$, as shown in Fig. 9. The hook 20 stays in engagement with this part during the next half revolution of the parts until they reach the position shown in Fig. 8 and are thereafter released, as heretofore described, whereupon the operation is repeated. In all these cases, it is to be noted that means other than centrifugal force are relied upon to cause the striker to strike the bell, and that gravity is preferably the force employed. It is also to be noted that they employ means for moving the striker from the bell, and that the striker is released and permitted to strike the bell if the speed is low, and prevented from striking the bell if the speed is high.

As will be evident to those skilled in the art, my invention permits of various other modifications without departing from the spirit thereof or the scope of the appended claims.

What I claim is:

1. In a speed indicator for a revolving shaft, the combination of a gong, a striker adapted to strike the gong, means rotating with the shaft for cocking the striker during one portion of the revolution of the shaft and releasing it during another portion of such revolution, and a means moving with said shaft for preventing said striker from striking the gong when the speed of the shaft exceeds a given rate.

2. In a speed indicator for a revolving shaft, the combination of a gong, a striker tending to move toward said gong to strike the same, a cocking-and-releasing-means, and an intercepting means for preventing said striker from striking the gong when the speed of the shaft exceeds a given rate, both of said means revolving with said shaft.

3. In a speed indicator for a revolving shaft, the combination of a gong, a striker tending to move toward said gong to strike the same, a cocking-and-releasing-means, and an intercepting means for preventing said striker from striking the gong when the speed of the shaft exceeds a given rate, both of said means and said gong revolving with said shaft, and said means being inclosed by said gong.

4. In a speed indicator for a revolving shaft, the combination of a gong, a striker tending to move toward said gong to strike the same, a cocking-and-releasing-means, and an intercepting means for preventing said striker from striking the gong when the speed of the shaft exceeds a given rate, said gong being bell shaped and inclosing said cam and striker.

5. In a speed indicator for a revolving shaft, the combination of a gong, a striker tending to move toward said gong to strike the same, a cocking-and-releasing-means, and an intercepting means for preventing said striker from striking the gong when the speed of the shaft exceeds a given rate, and a support to which said striker is pivoted.

6. In a speed indicator for a revolving shaft, the combination of a gong, a striker tending to move toward said gong to strike the same, a revolving cocking-and-releasing-means, and an intercepting means for preventing said striker from striking the gong when the speed of the shaft exceeds a given rate, said gong being bell shaped and inclosing said means and striker, said striker having a portion remote from the striking head thereof engaging said means, and a normally stationary member to which said striker is pivoted.

7. In a speed indicator for a revolving shaft, the combination of a gong, a striker tending to move toward said gong to strike the same, a revolving cocking-and-releasing-means, and an intercepting means for preventing said striker from striking the gong when the speed of the shaft exceeds a given rate, said gong being bell shaped and inclosing said means and striker, said striker having a portion remote from the striking head thereof engaging said means, and a normally stationary member to which said striker is pivoted, said member being adjustable about the axis of revolution of said means.

MEREDITH LEITCH.

Witnesses:
W. B. Murdock,
E. Loundsbery Du Bois.

Correction in Letters Patent No. 1,150,130.

It is hereby certified that in Letters Patent No. 1,150,130, granted August 17, 1915, upon the application of Meredith Leitch, of Poughkeepsie, New York, for an improvement in "Speed-Indicators," an error appears in the printed specification requiring correction as follows: Page 2, line 21, for the word "leasing" read *releasing;* and that the said Letters Patent should be read with this correction therein that the same may conform to the record of the case in the Patent Office.

Signed and sealed this 7th day of September, A. D., 1915.

[SEAL.]

J. T. NEWTON,
*Acting Commissioner of Patents.*